US011936258B2

(12) United States Patent
Chen

(10) Patent No.: US 11,936,258 B2
(45) Date of Patent: Mar. 19, 2024

(54) METHOD FOR CONTROLLING OUTPUTS OF ELECTRIC MOTORS

(71) Applicant: Feng-Tien Chen, Taichung (TW)

(72) Inventor: Feng-Tien Chen, Taichung (TW)

( * ) Notice: Subject to any disclaimer, the term of this patent is extended or adjusted under 35 U.S.C. 154(b) by 310 days.

(21) Appl. No.: 17/550,504

(22) Filed: Dec. 14, 2021

(65) Prior Publication Data

US 2023/0163672 A1 May 25, 2023

(30) Foreign Application Priority Data

Nov. 24, 2021 (TW) .................................. 110143809

(51) Int. Cl.
*H02K 21/16* (2006.01)
*F04B 49/02* (2006.01)
*F25B 49/02* (2006.01)
*H02K 1/16* (2006.01)

(52) U.S. Cl.
CPC ............. *H02K 21/16* (2013.01); *F04B 49/02* (2013.01); *F25B 49/02* (2013.01); *H02K 1/16* (2013.01)

(58) Field of Classification Search
CPC . H02K 21/16; H02K 1/16; H02K 3/28; F04B 49/02; F04B 2203/02; F04B 35/04; F25B 49/02; F25B 49/022
USPC ...................................................... 310/49.23
See application file for complete search history.

(56) References Cited

U.S. PATENT DOCUMENTS

| 4,644,242 A * | 2/1987 | Takata ..................... H02P 25/20 318/773 |
| 5,239,251 A * | 8/1993 | Lauw ....................... H02P 27/05 388/930 |
| 2002/0125855 A1* | 9/2002 | Johnson ................... B60L 50/40 318/801 |
| 2015/0236634 A1* | 8/2015 | Han .......................... H02P 5/74 318/504 |
| 2020/0136546 A1* | 4/2020 | Chen ........................ H02P 25/22 |
| 2023/0163672 A1* | 5/2023 | Chen ......................... H02K 3/28 310/49.23 |
| 2023/0268784 A1* | 8/2023 | Chen ......................... H02K 1/16 310/216.001 |

FOREIGN PATENT DOCUMENTS

TW          I619886 B     4/2018

\* cited by examiner

*Primary Examiner* — Ahmed Elnakib
(74) *Attorney, Agent, or Firm* — Birch, Stewart, Kolasch & Birch, LLP

(57) ABSTRACT

A method for controlling outputs of electric motors includes the steps of (a) providing an electric motor including a stator winding unit selected from first to fourth winding groups, each of the winding groups having at least a primary winding with a first number of poles and a first rated power, and at least a secondary winding with a second number of poles being the same as or different from the first number of poles and a second rated power being the same as or different from the first rated power; and (b) providing a control device respectively coupled with the electric motor and an external electrical power source for sensing a needed loading state of the electric motor and suppling a required connection relationship between the stator winding unit and the external electrical power source based on the needed loading state sensed by the control device.

9 Claims, 9 Drawing Sheets

METHOD FOR CONTROLLING OUTPUTS OF ELECTRIC MOTORS

BACKGROUND OF THE INVENTION

1. Field of the Invention

The present invention relates to electric motors, and particularly to a method for controlling the outputs of electric motors.

2. Description of the Related Art

At present, devices that require electric motors to provide different output powers, such as compressors of air conditioners, are usually achieved by means of a variable-frequency drive. However, the time from starting to the rated load of an electric motor equipped with a variable-frequency drive is usually longer than that of a non-installed one, so it consumes more electric energy. In addition, a variable-frequency drive usually includes rectification (AC to DC), filtering, inverter (DC to AC), braking unit, drive unit, detection unit micro-processing unit, etc., so it is very costly in manufacturing. Taiwan Patent No. 1619886 disclosed an improved compressor to solve the aforementioned disadvantages. The compressor does not use a variable-frequency drive but provides two sets of operating windings with different output power and a switch which connects respectively an external electrical power source to each set of the operating windings to provide different output power. However, this improved compressor just provides two different output powers, so it is impracticability.

One of the objectives of the present invention is to provide a method for controlling the outputs of electric motors. This method does not use a variable-frequency drive, and can provide a variety of output modes to supply different loading states.

SUMMARY OF THE INVENTION

Thus, one method for controlling the outputs of electric motors according to the present invention comprises a step of providing at least an electric motor comprising a stator, a rotor being rotatable relative to the stator, the stator including a plurality of stator slots, a plurality of stator teeth, and a stator winding unit being wound on the stator teeth and installed in the stator slots. The stator winding unit is selected from a first winding group, a second winding group, a third winding group and a fourth winding group. The first winding group comprises a first primary winding with a first number of poles and a first rated power and a first secondary winding with the first number of poles and a second rated power being smaller than the first rated power. The second winding group comprises a second primary winding with a second number of poles and a third rated power, and a second secondary winding with a third number of poles and a fourth rated power being smaller than the third rated power. The third winding group comprises a third primary winding with a fourth number of poles and a fifth rated power, a fourth primary winding with a fifth number of poles and a sixth rated power being smaller than the fifth rated power, a third secondary winding with the fourth number of poles and a seventh rated power being smaller than the fifth rated power, and a fourth secondary winding with the fifth number of poles and an eighth rated power being smaller than the sixth rated power. The fourth winding group comprises a fifth primary winding with a sixth number of poles and a ninth rated power, a fifth secondary winding with the sixth number of poles and a tenth rated power being smaller than the ninth rated power, and a sixth second secondary winding with the sixth number of poles and an eleventh rated power being smaller than the tenth rated power. The method for controlling the outputs of electric motors further comprises another step of providing a first control device respectively coupled with the electric motor and an external electrical power source for sensing a needed loading state of the electric motor and suppling a required connection relationship between the stator winding unit and the external electrical power source based on the needed loading state sensed by the first control device. The required connection relationship between the stator winding unit and the external electrical power source selected from one of the following connection relationships: when the stator winding unit comprises the first winding group, and the first control device senses a first needed loading state, the first primary winding and the first secondary winding are simultaneously connected to the external electrical power source; when the stator winding unit comprises the first winding group, and the first control device senses a second needed loading state being smaller than the first needed loading state, only the first primary winding is connected to the external electrical power source; when the stator winding unit comprises the second winding group, and the first control device senses a third needed loading state, the second primary winding is connected to the external electrical power source; when the stator winding unit comprises the second winding group, and the first control device senses a fourth needed loading state being smaller than the third needed loading state, the second secondary winding is connected to the external electrical power source; when the stator winding unit comprises the third winding group, and the first control device senses a fifth needed loading state, the third primary winding and the third secondary winding are connected to the external electrical power source; when the stator winding unit comprises the third winding group, and the first control device senses a sixth needed loading state being smaller than the fifth needed loading state, only the third primary winding is connected to the external electrical power source; when the stator winding unit comprises the third winding group, and the first control device senses a seventh needed loading state, the fourth primary winding and the fourth secondary winding are connected to the external electrical power source; when the stator winding unit comprises the third winding group, and the first control device senses an eighth needed loading state being smaller than the seventh needed loading state, only the fourth primary winding is connected to the external electrical power source; when the stator winding unit comprises the fourth winding group, and the first control device senses a ninth needed loading state, the fifth primary winding, the fifth secondary winding and the sixth secondary winding are connected to the external electrical power source; when the stator winding unit comprises the fourth winding group, and the first control device senses a tenth needed loading state being smaller than the ninth needed loading state, the fifth primary winding and the fifth secondary winding are connected to the external electrical power source; when the stator winding unit comprises the fourth winding group, and the first control device senses a eleventh needed loading state being smaller than the tenth needed loading state, the fifth primary winding and the sixth secondary winding are connected to the external electrical power source; and when the stator winding unit comprises the fourth winding group, and the first control device senses a twelfth needed loading state being smaller than the eleventh needed loading state, only the fifth primary winding is connected to the external electrical power source.

It must be mentioned here that the number of poles refers to the number of magnetic poles contained in each phase of an electric motor.

Another method for controlling the outputs of electric motors according to the present invention is that the first control device comprises a sensing unit coupled with the electric motor for sensing a needed loading state thereof, and a controlling unit respectively coupled with the electric motor and an external electrical power source for suppling a required connection relationship between the stator winding unit and the external electrical power source based on the sensed loading state of the sensing unit.

Another method for controlling the outputs of electric motors according to the present invention comprises the steps of: providing a first electric motor comprising a first stator, a first rotor being rotatable relative to the first stator, the first stator including a plurality of first stator slots, a plurality of first stator teeth, and a first stator winding unit being wound on the first stator teeth and installed in the first stator slots, the first stator winding unit comprising a first winding group comprising a first primary winding with a first number of poles and a first rated power and a first secondary winding with the first number of poles and a second rated power being smaller than the first rated power; providing a second electric motor comprising a second stator, a second rotor being rotatable relative to the second stator, the second stator including a plurality of second stator slots, a plurality of second stator teeth, and a second stator winding unit being wound on the second stator teeth and installed in the second stator slots, the second stator winding unit comprising a second winding group comprising a second primary winding with the first number of poles and a third rated power and a second secondary winding with the first number of poles and a fourth second rated power being smaller than the third rated power; and providing a second control device respectively coupled with the first electric motor, the second electric motor and an external electrical power source for sensing a needed loading state of the first and second electric motors and suppling a required connection relationship between the first stator winding unit, the second stator winding unit and the external electrical power source based on the needed loading state sensed by the second control device, the required connection relationship between the first stator winding unit, the second stator winding unit and the external electrical power source selected from one of the following connection relationships: when the second control device senses a first needed loading state, the first primary winding, the first secondary winding, the second primary winding and the second secondary winding are simultaneously connected to the external electrical power source; when the second control device senses a second needed loading state, the first primary winding and the second primary winding are simultaneously connected to the external electrical power source; when the second control device senses a third needed loading state, the first primary winding and the first secondary winding are simultaneously connected to the external electrical power source; when the second control device senses a fourth needed loading state, only the first primary winding or the second primary winding is connected to the external electrical power source; and when the second control device senses a fifth needed loading state, only the first secondary winding or the second secondary winding is connected to the external electrical power source.

Another method for controlling the outputs of electric motors according to the present invention comprises the steps of: providing a third electric motor comprising a third stator, a third rotor being rotatable relative to the third stator, the third stator including a plurality of third stator slots, a plurality of third stator teeth, and a third stator winding unit being wound on the third stator teeth and installed in the third stator slots, the third stator winding unit comprising a third winding group comprising a third primary winding with a third number of poles and a third rated power and a third secondary winding with the third number of poles and a fourth rated power being smaller than the third rated power; providing a fourth electric motor comprising a fourth stator, a fourth rotor being rotatable relative to the fourth stator, the fourth stator including a plurality of fourth stator slots, a plurality of fourth stator teeth, and a fourth stator winding unit being wound on the fourth stator teeth and installed in the fourth stator slots, the fourth stator winding unit comprising a fourth winding group comprising a fourth primary winding with a fourth number of poles and a fifth rated power and a fourth secondary winding with a fifth number of poles and a sixth rated power being smaller than the fifth rated power; and providing a third control device respectively coupled with the third electric motor, the fourth electric motor and an external electrical power source for sensing a needed loading state of the third and fourth electric motors and suppling a required connection relationship between the third stator winding unit, the fourth stator winding unit and the external electrical power source based on the needed loading state sensed by third control device, the required connection relationship between the third stator winding unit, the fourth stator winding unit and the external electrical power source selected from one of the following connection relationships; when the third control device senses a first needed loading state, the third primary winding and the third secondary winding are simultaneously connected to the external electrical power source; when the third control device senses a second needed loading state, only the third primary winding is connected to the external electrical power source; when the third control device senses a third needed loading state, only the third secondary winding is connected to the external electrical power source; when the third control device senses a fourth needed loading state, only the fourth primary winding is connected to the external electrical power source; and when the third control device senses a fifth needed loading state, only the fourth secondary winding is connected to the external electrical power source.

Another method for controlling the outputs of electric motors according to the present invention comprises the steps of: providing a fifth electric motor comprising a fifth stator, a fifth rotor being rotatable relative to the fifth stator, the fifth stator including a plurality of fifth stator slots, a plurality of fifth stator teeth, and a fifth stator winding unit being wound on the fifth stator teeth and installed in the fifth stator slots, the fifth stator winding unit comprising a fifth winding group comprising a fifth primary winding with a sixth number of poles and a seventh rated power and a fifth secondary winding with the sixth number of poles and a eighth rated power being smaller than the seventh rated power; providing a sixth electric motor comprising a sixth stator, a sixth rotor being rotatable relative to the sixth stator, the sixth stator including a plurality of sixth stator slots, a plurality of sixth stator teeth, and a sixth stator winding unit being wound on the sixth stator teeth and installed in the sixth stator slots, the sixth stator winding unit comprising a sixth winding group comprising a sixth primary winding with the sixth number of poles and a ninth rated power, a sixth secondary winding with the sixth number of poles and a tenth rated power being smaller than the ninth rated power, a seventh primary winding with a seventh number of poles and a eleventh rated power, a seventh secondary winding with the seventh number of poles and a twelfth rated power being smaller than the eleventh rated power; providing a fifth control device respectively coupled with the fifth electric motor, the sixth electric motor and an external electrical power source for sensing a needed loading state of the fifth and sixth electric motors, and supplying a required connection relationship between the fifth stator winding unit, the sixth stator winding unit and the external electrical power source based on the needed loading state sensed by the fourth control device; the required connection relationship between the fifth stator winding unit, the sixth stator winding unit and the external electrical power source selected from one of the following connection relationships; when the fourth control device senses a first needed loading state, the fifth primary winding, the fifth secondary winding, the sixth primary winding and the sixth secondary winding are simultaneously connected to the external electrical power source; when the fourth control device senses a second needed loading state, the fifth primary winding and the fifth secondary winding are simultaneously connected to the external electrical power source; when the fourth control device senses a third needed loading state, the sixth primary winding and the sixth secondary winding are simultaneously connected to the external electrical power source; when the fourth control device senses a fourth needed loading state, the fifth primary winding and the sixth primary winding are simultaneously connected to the external electrical power source; when the fourth control device senses a fifth needed loading state, the seventh primary winding and the seventh secondary winding are simultaneously connected to the external electrical power source; when the fourth control device senses a sixth needed loading state, only the fifth primary winding is connected to the external electrical power source; when the fourth control device senses a seventh needed loading state, only the sixth primary winding is connected to the external electrical power source; when the fourth control device senses an eighth needed loading state, only the seventh primary winding is connected to the external electrical power source; when the fourth control device senses a ninth needed loading state, only the fifth secondary winding is connected to the external electrical power source; when the fourth control device senses a tenth needed loading state, only the sixth secondary winding is connected to the external electrical power source; and when the fourth control device senses a eleventh needed loading state, only the seventh secondary winding is connected to the external electrical power source.

Another method for controlling the outputs of electric motors according to the present invention comprises the steps of; providing a seventh electric motor comprising a seventh stator, a seventh rotor being rotatable relative to the seventh stator, the seventh stator including a plurality of seventh stator slots, a plurality of seventh stator teeth, and a seventh stator winding unit being wound on the seventh stator teeth and installed in the seventh stator slots, the seventh stator winding unit comprising a seventh winding group comprising a seventh primary winding with an eighth number of poles and a twelfth rated power and a seventh secondary winding with the eighth number of poles and a thirteenth rated power being smaller than the twelfth rated power, providing an eighth electric motor comprising an eighth stator, eighth rotor being rotatable relative to the eighth stator, the eighth stator including a plurality of eighth stator slots, a plurality of eighth stator teeth, and an eighth stator winding unit being wound on the eighth stator teeth and installed in the eighth stator slots, the eighth stator winding unit comprising an eighth winding group comprising an eighth primary winding with the eighth number of poles and a fourteenth rated power, an eighth secondary winding with the eighth number of poles and a fifteenth rated power being smaller than the fourteenth rated power, a ninth secondary winding with the eighth number of poles and a sixteenth rated power being smaller than the fifteenth rated power; and providing a sixth control device respectively coupled with the seventh electric motor, the eighth electric motor and an external electrical power source for sensing a needed loading state of the seventh and eighth electric motors, and supplying a required connection relationship between the seventh stator winding unit, the eighth stator winding unit and the external electrical power source based on the needed loading state sensed by the sixth control device; the required connection relationship between the seventh stator winding unit, the eighth stator winding unit and the external electrical power source selected from one of the following connection relationships; when the sixth control device senses a first needed loading state, the seventh primary winding, the seventh secondary winding, the eighth primary winding primary winding, the eighth secondary winding and the ninth secondary winding are simultaneously connected to the external electrical power source; when the sixth control device control device senses a second needed loading state, the seventh primary winding and the eighth primary winding are simultaneously connected to the external electrical power source; when the sixth control device control device senses a third needed loading state, the seventh primary winding and the seventh secondary winding are simultaneously connected to the external electrical power source; when the sixth control device control device senses a fourth needed loading state, the eighth primary winding, the eighth secondary winding and the ninth secondary winding are simultaneously connected to the external electrical power source; when the sixth control device control device senses a fifth needed loading state, only the seventh primary winding is connected to the external electrical power source; when the sixth control device control device senses a sixth needed loading state, only the seventh secondary winding is connected to the external electrical power source; when the sixth control device control device senses a seventh needed loading state, the eighth primary winding and the eighth secondary winding are simultaneously connected to the external electrical power source; when the sixth control device control device senses an eighth needed loading state, the eighth primary winding and the ninth secondary winding are simultaneously connected to the external electrical power source; when the sixth control device control device senses a ninth needed loading state, only the eighth primary winding is connected to the external electrical power source; when the sixth control device control device senses a tenth needed loading state, only the eighth secondary winding is connected to the external electrical power source; and when the sixth control device control device senses an eleventh needed loading state, only the ninth secondary winding is connected to the external electrical power source.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE INVENTION

Figure 1:
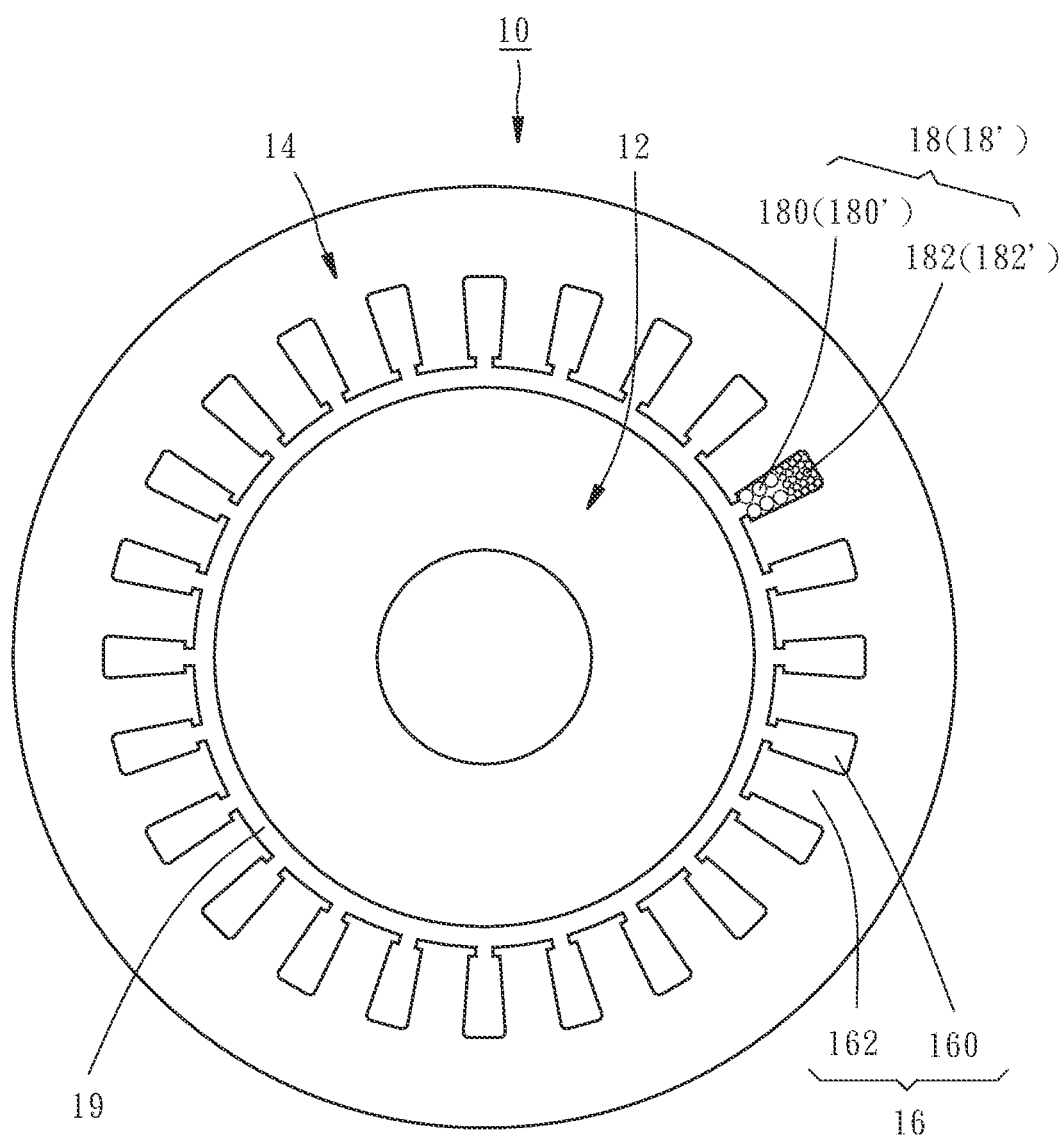
FIG. 1 is a cross-sectional view of a first electric motor according to a first preferred embodiment of the present invention.
Figure 2:
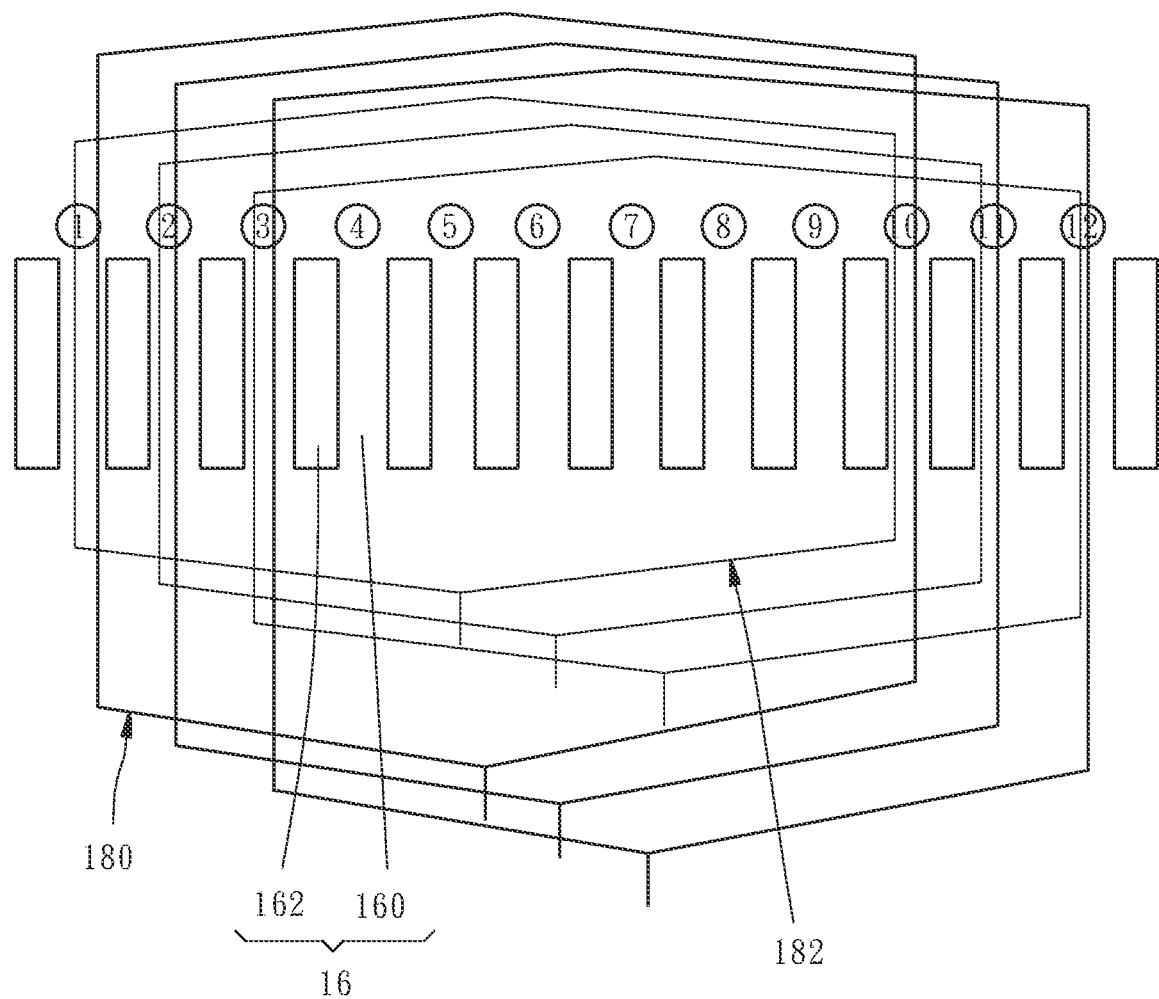
FIG. 2 is a schematic view of the winding pattern of a stator winding unit of the first electric motor.
Figure 3:
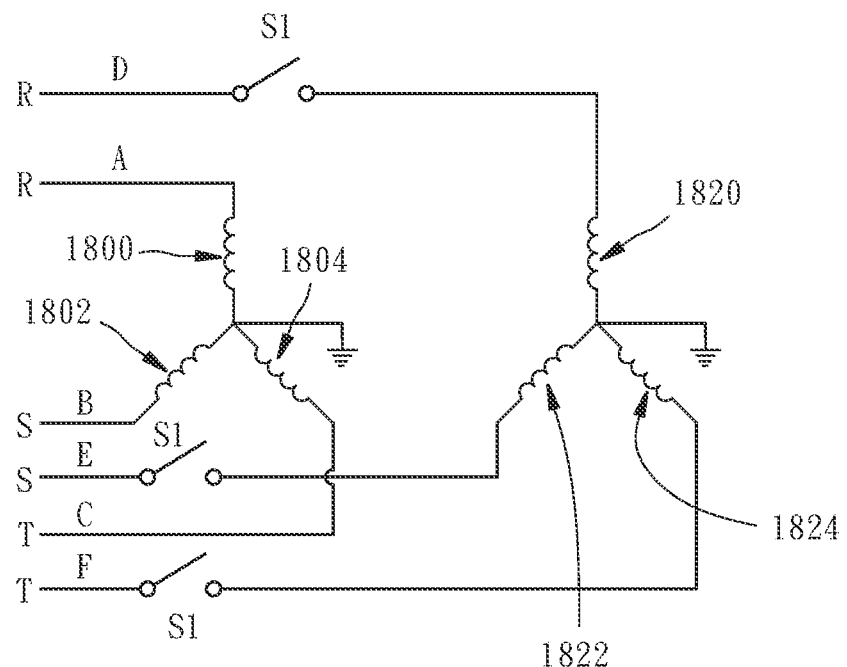
FIG. 3 is a schematic view of the electric circuit of a stator winding unit of the first electric motor.
Figure 4:
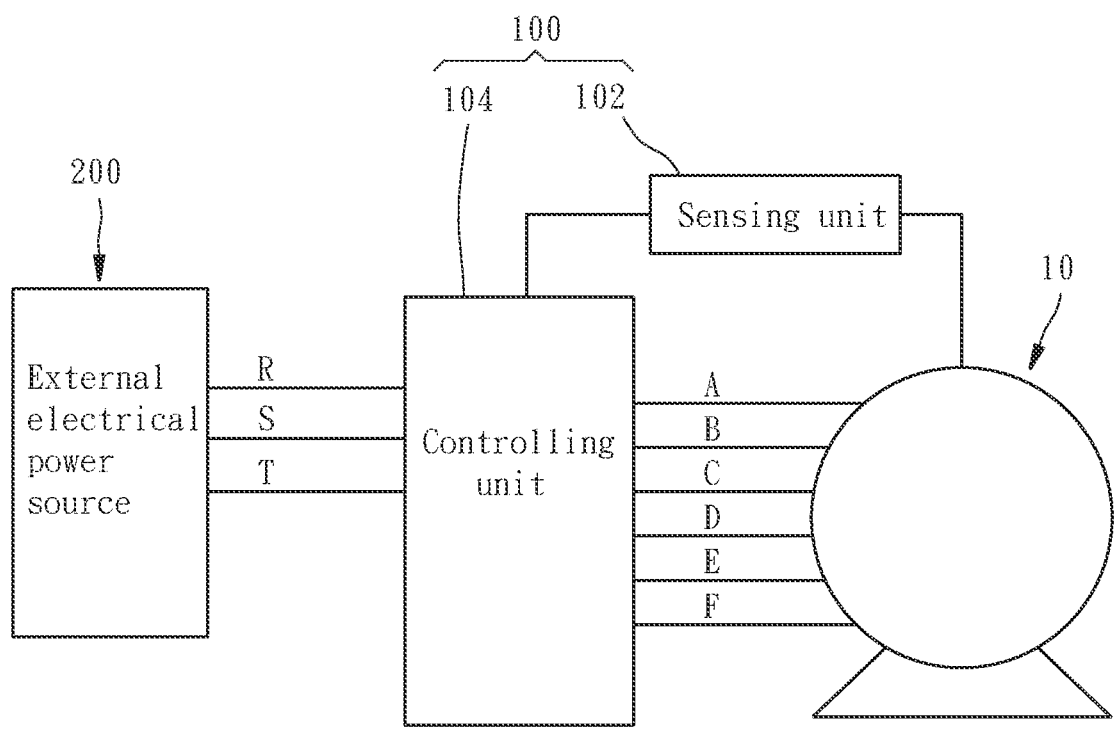
FIG. 4 is a block diagram illustrating the electric power connection of the first preferred embodiment.

Referring firstly to FIG. 1 to FIG. 4, a first electric motor 10 according to a first preferred embodiment of the present invention is shown comprising a rotor unit 12 and a stator unit 14. The rotor unit 12 rotates relative to the stator unit 14. The stator unit 14 includes a stator core 16, a stator winding unit 18 and a through hole 19 inserted through by the rotor unit 12. The stator core 16 includes thirty-six first stator slots 160 and first stator teeth 162 defined by two adjacent first stator slots 160. In this embodiment, the stator winding unit 18 is a first winding group (the following is also indicated by 18). The first winding group 18 is wound on each of the first stator teeth 162 and installed in each of the first stator slots 160. The first winding group 18 comprises a primary winding 180 and a secondary winding 182. The primary winding 180 has four poles and 20 HP rated power. The secondary winding 182 also has four poles but only has 2.5 HP rated power. The pole pitch of the primary winding 180 and the secondary winding 182 are both nine (as shown in FIG. 2). The difference between the rated power of the primary windings 180 and the secondary windings 182 can be achieved by the wire diameter or the number of turns of windings. In more detail, as shown in FIG. 3, in this embodiment, the primary windings 180 includes an R-phase primary winding 1800, an S-phase primary winding 1802, and a T-phase primary winding 1804, which are connected in a Y-shape. The secondary winding 182 includes an R-phase secondary winding 1820, an S-phase secondary winding 1822, and a T-phase secondary winding 1824, which are also connected in a Y-shape.

In addition, in this embodiment, a first control device 100 is provided, which can be a programmable logic controller (PLC). The first control device 100 comprises a first sensing unit 102 and a first controlling unit 104. The first sensing unit 102 is respectively coupled with the electric motor 10 and the first controlling unit 104. The first controlling unit 104 is respectively coupled with the electric motor 10 and an external electrical power source 200. The sensing unit 102 will sense a needed loading state of the electric motor 10 and send it to the controlling unit 104. The controlling unit 104 will supply a required connection relationship between the stator winding unit 18 and the external electrical power source 200 based on the needed loading states sensed by the sensing unit 102. In this embodiment, the first control unit 104 may include a plurality of first switches S1 disposed between the secondary winding 182 and the external electrical power source. In more detail, as shown in FIG. 3, the external electrical power source 200 has an R-phase output end, an S-phase output end and a T-phase output end, which are connected respectively to the control unit 104. The R-phase primary winding 1800 is directly connected to the R-phase output end via a line A, the S-phase primary winding 1802 is directly connected to the S-phase output end via a line B. and the T-phase primary windings 1804 is directly connected to the T-phase output end via a line C. The R-phase secondary winding 1820 is connected to the R-phase output via a line D with the first switch S1, the S-phase secondary winding 1822 is connected to the S-phase output via a line E with the first switch S1, and the T-phase secondary winding 1824 is connected to the T-phase output via a line F with the first switch S1. When the sensing unit 102 senses that the electric motor 10 needs to operate in a first needed loading state, such as 22.5 HP, the control unit 104 connects each first switch S1 to the external electrical power source 200 at the same time. At this time, the primary winding 180 and the secondary winding 182 are simultaneously connected to the external electrical power source 200 for suppling the first needed loading state. When the sensing unit 102 senses that the electric motor 10 only needs to operate under a second needed loading state that is smaller than the first loading state, such as 20 HP, each of the switches S1 of the control unit 104 is shut off. At this time, only the primary winding 180 is connected to the external electrical power source 200 for suppling the second loading state.

Figure 5:
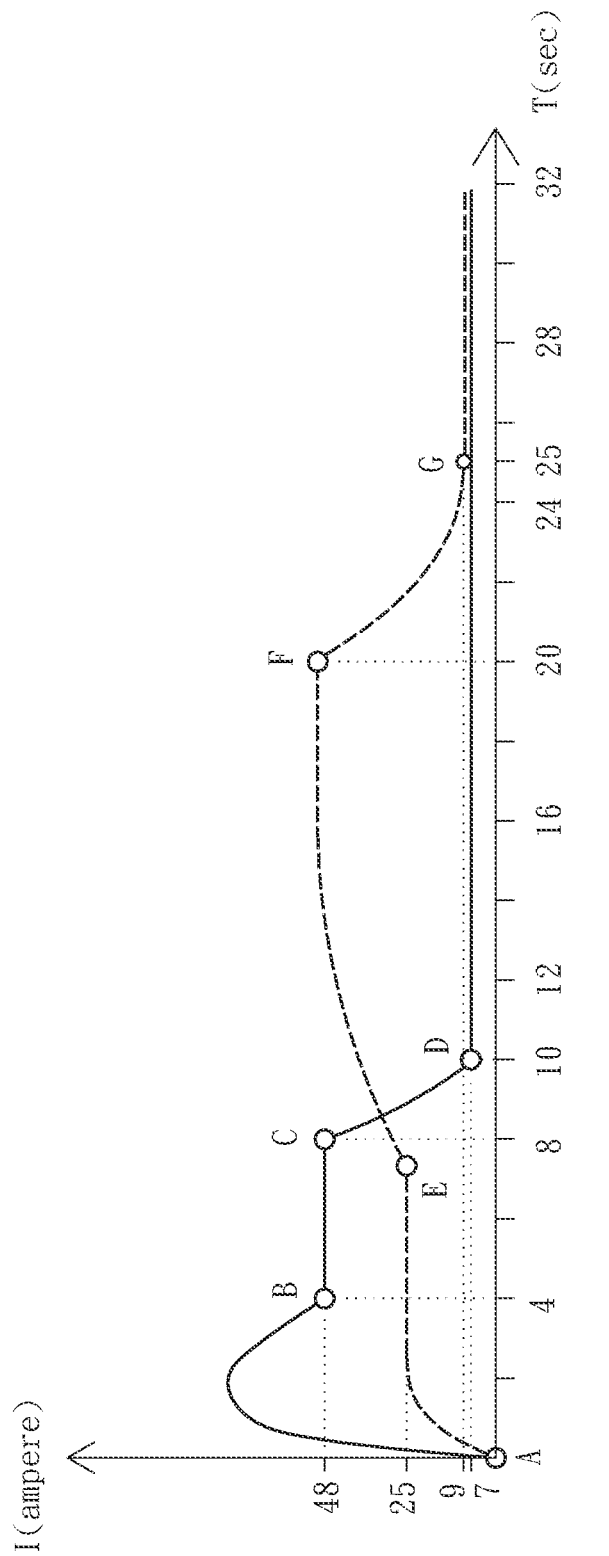
FIG. 5 is a comparing chart of energy consumption between the first preferred embodiment and the three-phase induction motor thereof when controlled by a variable-frequency drive.

To show the advantages of the present invention, please referring to FIG. 5, it shows that in a practical operation, the energy consumption of the first preferred embodiment of the present invention and the three-phase induction motor of the first preferred embodiment when controlled by a variable-frequency drive (hereinafter referred to as the prior art). In this operation, the external electrical power source 200 has a voltage of 220 volts and a frequency of 60 Hz. The vertical axis of FIG. 5 shows the current I, and the unit is ampere. The horizontal axis of FIG. 5 shows the time T, and the unit is second. And, the energy consumption formula used here is W=IVT (where I is current, V is voltage, and T is time).

The curve represented by the dotted line in FIG. 5 shows the energy consumption of the prior art from an unstarted state to a started state, from the starting state to a fully loading state, and from the fully loading state to an unloading state. It can be seen from the dotted line curve that the prior art takes about 8 seconds from the unstarted state to the started state (that is, from point A to point E), and the average current used is 25 amperes; takes about 12 seconds from the started state to the fully loading state (that is, from point E to point F), and the average use current is (25+48)/2=36.5 amperes; and takes about 5 seconds from the fully loading state to the unloading state (that is, from point F to point G), and the average use current is (48+9)/2=28.5 seconds. According to this data, the electric energy consumed during this period is $$W_P=25\times220\times8+36.5\times220-12+28.5\times220\times5=171{,}710 \text{ joules.}$$

The curve represented by the solid line in FIG. 5 shows the energy consumption of the electric motor 10 controlled by the first preferred embodiment of the present invention from an unstarted state to a started state, from the starting state to a fully loading state, and from the fully loading state to an unloading state. It can be seen from the solid line curve that the electric motor 10 takes about 4 seconds from the unstarted state to the started state (that is, from point A to point B), and the average current used is 48 amperes; takes about 8 seconds from the started state to the fully loading state (that is, from point B to point C), takes about 2 seconds from the fully loading state to the unloading state (that is, from point C to point D), and the average use current is $(48+7)/2=27.5$ amperes; and the electric motor 10 lasts for about 15 seconds (that is, from point D to point G), and the average current used is 7 amperes. According to this data, the electric energy consumed during this period is $$Wi=48\times220\times4+48\times220\times4+27.5\times220\times2+7\times220\times15=119{,}680 \text{ joules}$$

Thus, from the data shown in FIG. 5, it can be proved that under the same operating conditions, the electric motor 10 controlled by of the present invention can indeed reduce the consumed electric energy compared with the prior art. The reduced electric energy is about 52,030 joules, which is about 30% of the electric energy consumed by the prior art.

The following is a second preferred embodiment of the present invention. The electric motor provided in the second preferred embodiment is a three-phase induction motor as provided in the first preferred embodiment. As shown in FIG. 1, the difference between the first and second preferred embodiment is that the stator winding unit of the electric motor in the second preferred embodiment comprises a second winding group 18'. The second winding group 18' includes a primary winding 180' and a secondary winding 182'. The primary winding 180' has four magnetic poles and 20 HP rated power. When the frequency of the external electrical power source 200 is 60 Hz, the rotating speed of the electric motor is 1800 rpm. The secondary winding 182' has twelve magnetic poles and 2.5 HP. When the frequency of the external electrical power source 200 is 60 Hz, the rotating speed of the electric motor is 600 rpm. Whereby, when the first control device 100 senses that the electric motor needs to operate in a first needed loading state, only the primary winding 180' is connected with the external electrical power source 200, and when the first control device 100 senses that the electric motor needs to operate in a second needed loading state, only the secondary winding 182' is connected with the external electrical power source 200.

Figure 6:
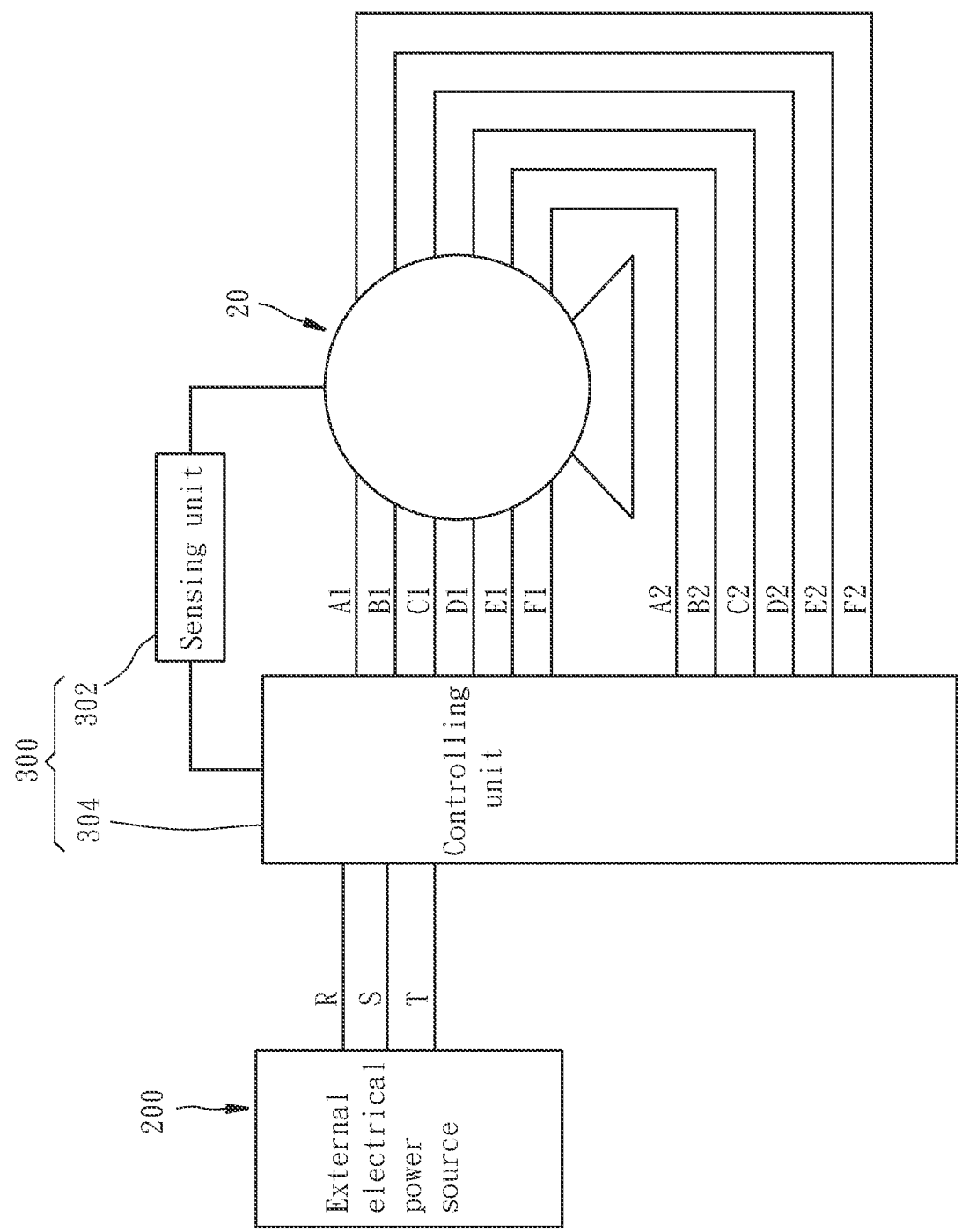
FIG. 6 is a block diagram illustrating the electric power connection of a third preferred embodiment of the present invention.
Figure 7:
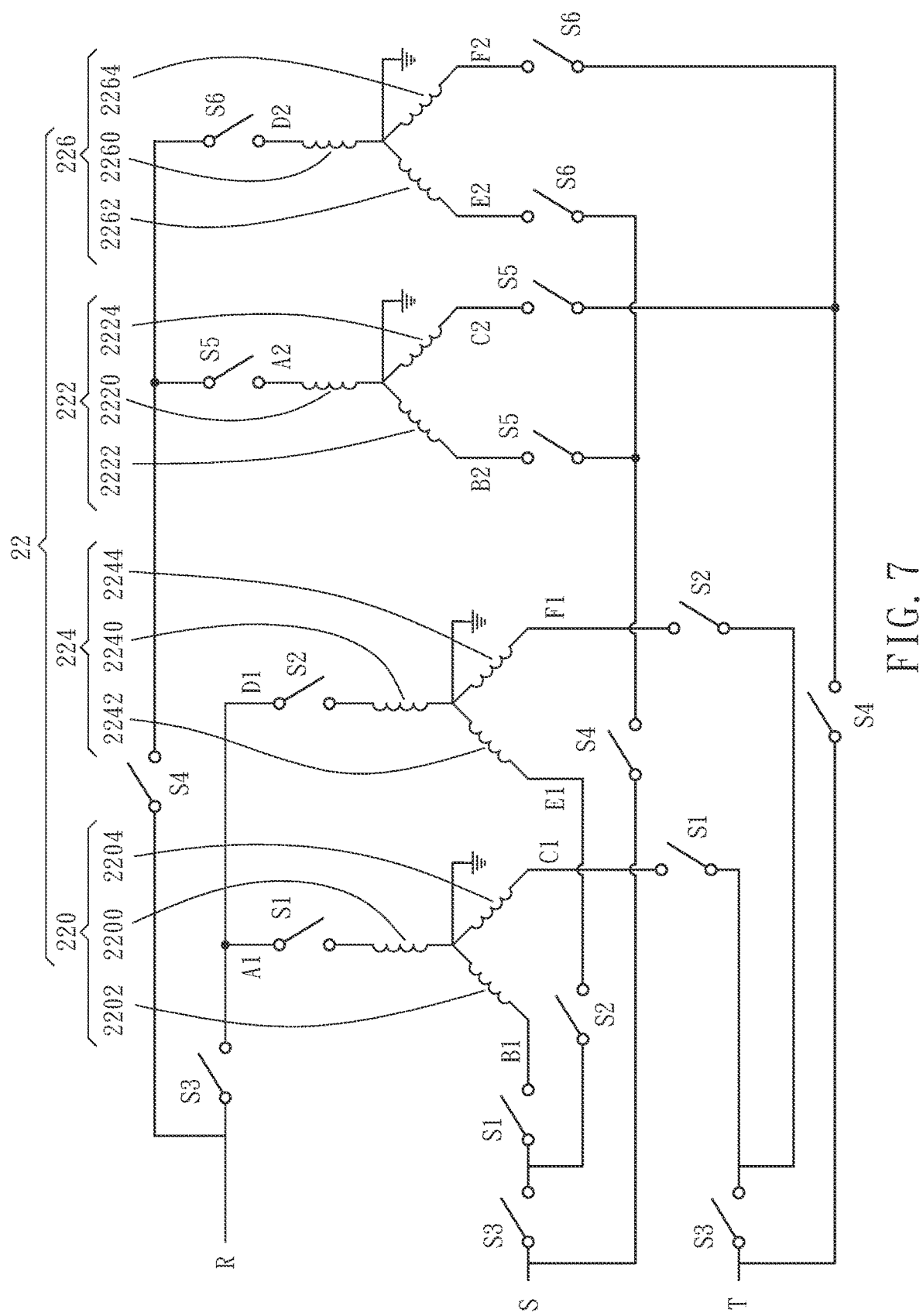
FIG. 7 is a schematic view of the winding pattern of a stator winding unit of the third preferred embodiment.

Next, as shown in FIGS. 6 and 7, a third preferred embodiment of the present invention is disclosed. An electric motor 20 provided in the third preferred embodiment is also a three-phase induction motor as provided in the first preferred embodiment. The difference between the first and third preferred embodiments is that a stator winding unit 22 of the electric motor 20 in the third preferred embodiment comprises a third winding group (the following is also indicated by 22). The third winding group 22 comprises a first primary winding 220, a second primary winding 222, a first secondary winding 224 and a second secondary winding 226. The first primary winding 220 and the first secondary winding 224 both have a fourth number of poles, such as four, but the rated power of the first secondary winding 224 is smaller than that of the first primary winding 220. The second primary winding 222 and the second secondary winding 226 both has a fifth number of poles, such as twelve, but the rated power of the second secondary winding 226 is smaller than that of the second primary winding 220. In this embodiment, the rated power of the second primary winding 222 is smaller than that of the first primary winding 220.

In more detail, the first primary winding 220 includes an R-phase first primary winding 2200, an S-phase first primary winding 2202, and a T-phase first primary winding 2204, which are connected in a Y-shape. The first secondary winding 224 includes an R-phase first secondary winding 2240, an S-phase first secondary winding 2242, and a T-phase first secondary winding 2244, which are also connected in a Y-shape. The second primary winding 222 includes an R-phase second primary winding 2220, an S-phase second primary winding 2222, and a T-phase second primary winding 2224, which are connected in a Y-shape. The second secondary winding 226 includes an R-phase second secondary winding 2260, an S-phase second secondary winding 2262, and a T-phase second secondary winding 2264, which are also connected in a Y-shape. The first primary winding 220 and the first second primary winding 222 are connected in parallel. The first secondary winding 224 and the second secondary winding 226 are also connected in parallel.

The third embodiment of the present invention provides a second control device 300 comprising a second sensing unit 302 and a second controlling unit 304. The second sensing unit 302 is respectively coupled with the electric motor 20 and the second controlling unit 304. The second controlling unit 304 is respectively coupled with the electric motor 20 and a three phase external electrical power source 200. Similarly, the second sensing unit 302 will sense a needed loading state of the electric motor 20 and send it to the second controlling unit 304. The controlling unit 304 will supply a required connection relationship between the third winding group 22 and the external electrical power source 200 based on the needed loading states sensed by the second sensing unit 302.

In this embodiment, the second controlling unit 304 comprises a first switch S1, a second switch S2, a third switch S3, a fourth switch S4, a fifth switch S5 and a sixth switch S6. The R-phase first primary winding 2200 is connected to the R-phase output via an A1 line with the first switch S1 and the third switch S3. The S-phase first primary winding 2202 is connected to the S-phase output via a B1 line with the first switch S1 and the third switch S3, and the T-phase first primary winding 2204 is connected to the T-phase output via a C1 line with the first switch S1 and the third switch S3. The R-phase first secondary winding 2240 is connected to the R-phase output via a D1 line with the second switch S2 and the third switch S3. The S-phase first secondary winding 2242 is connected to the S-phase output via a E1 line with the second switch S2 and the third switch S3, and the T-phase first secondary winding 2244 is connected to the T-phase output via an F1 line with the second switch S2 and the third switch S3. The R-phase second primary winding 2220 is connected to the R-phase output via a A2 line with the fourth switch S4 and the fifth switch S5. The S-phase second primary winding 2222 is connected to the S-phase output via a B2 line with the fourth switch S4 and the fifth switch S5, and the T-phase second primary winding 2224 is connected to the T-phase output via a C2 line with the fourth switch S4 and the fifth switch S5. The R-phase second secondary winding 2260 is connected to the R-phase output via a D2 line with the fourth switch S4 and the sixth switch S6. The S-phase second secondary winding 2262 is connected to the S-phase output via a E2 line with the fourth switch S4 and the sixth switch S6, and the T-phase second secondary winding 2264 is connected to the T-phase output via an F2 line with the fourth switch S4 and the sixth switch S6.

When the sensing unit 302 senses that the electric motor 20 needs to operate in a first loading state, the control unit 304 will make the first switch S1, the second switch S2, and the third switch S3 on and fourth switch S4 off. At this time, the first primary winding 220 and the first second primary winding 222 will be connected to the external electrical power source 200 at the same time to supply the power needed by the first loading state. When the sensing unit 302 senses that the electric motor 20 needs to operate in a second loading state, the control unit 304 will make the first switch S1 and the third switch S3 on, the second switch S2 and fourth switch S4 off. At this time, only the first primary winding 220 will be connected to the external electrical power source 200 to supply the power needed by the second loading state. When the sensing unit 302 senses that the electric motor 20 needs to operate in a third loading state, the control unit 304 will make fourth switch S4, the fifth switch S5 and the sixth switch S6 on, and the third switch S3 off. At this time, the second primary winding 222 and the second secondary winding 226 will be connected to the external electrical power source 200 at the same time to supply the power needed by the third loading state. And when the sensing unit 302 senses that the electric motor 20 needs to operate in a fourth loading state, the control unit 304 will make fourth switch S4 and the fifth switch S5 on, and the third switch S3 and the sixth switch S6 off. At this time, only the second primary winding 222 will be connected to the external electrical power source 200 to supply the power needed by the fourth loading state.

Figure 8:
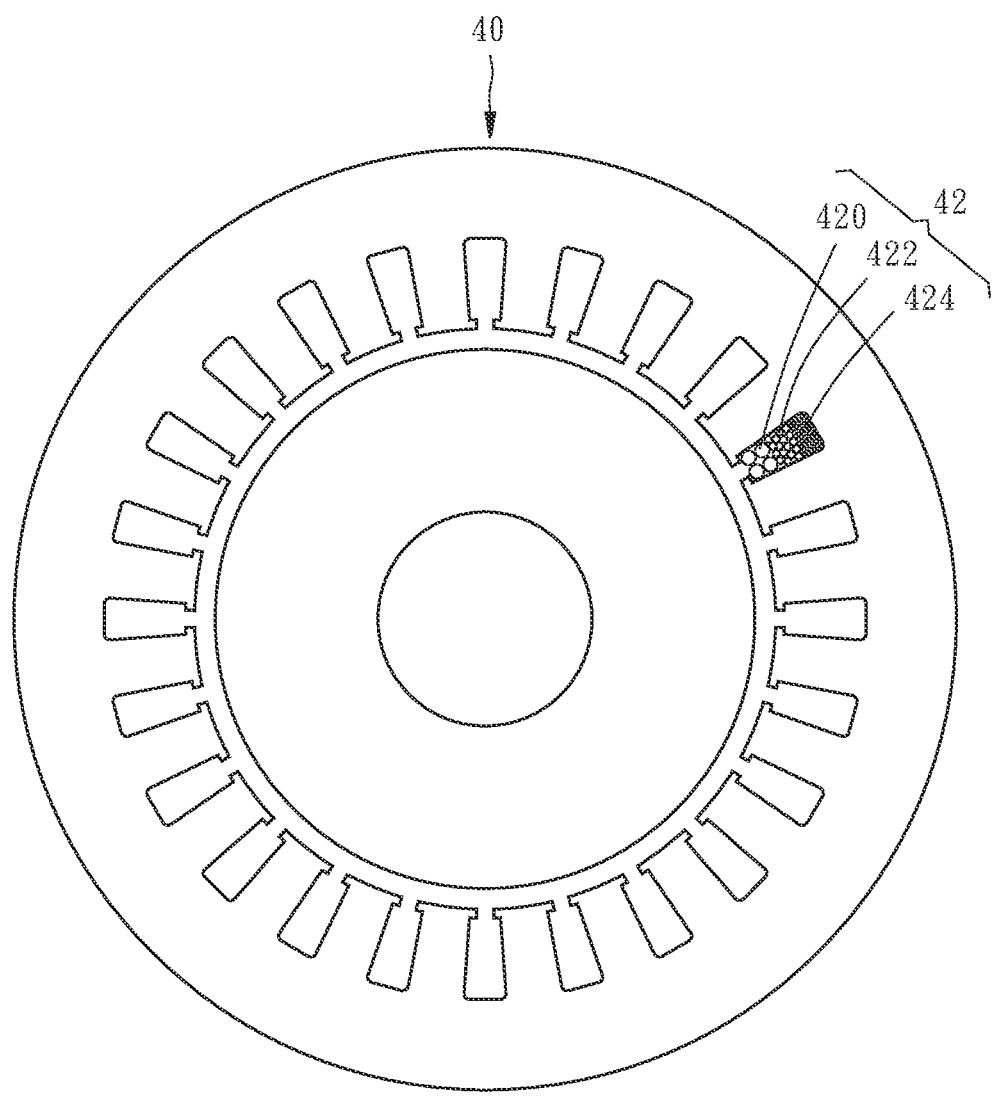
FIG. 8 is a cross-sectional view of an electric motor according to a fourth preferred embodiment of the present invention.

Then, as shown in FIG. 8, a fourth preferred embodiment of the present invention is disclosed. An electric motor 40 provided in the fourth preferred embodiment is also a three-phase induction motor as provided in the first preferred embodiment. The difference between the first and fourth preferred embodiment is that a stator winding unit 42 of the electric motor 40 in the fourth preferred embodiment comprises a fourth winding group (the following is also indicated by 42). The fourth winding group 42 comprises a first primary winding 420, a first secondary winding 422 and a second secondary winding 424. The first primary winding 420, the first secondary winding 422 and the second secondary winding 424 all have a fourth number of poles, such as four, but the rated power of the first secondary winding 422 is smaller than that of the first primary winding 420 and the rated power of the second secondary winding 424 is smaller than that of the first secondary winding 422. When the frequency of the external electrical power source 200 is 60 Hz, the rotating speed of the electric motor 40 is 1800 rpm. The fourth preferred embodiment similarly provides a control device respectively coupled with the electric motor 40 and an external electrical power source for sensing a needed different loading state of the electric motor 40 and suppling a required connection relationship between the stator winding unit 42 and the external electrical power source based on the needed loading state sensed by the control device. For example, when the control device senses that the electric motor 40 needs to operate in a first loading state, it will make the first primary winding 420, the first secondary winding 422 and the second secondary winding 424 all connect to the external electrical power source at the same time to supply the power required by the first loading state. When the control device senses that the electric motor 40 needs to operate in a second loading state, it will make the first primary winding 420 and the first secondary winding 422 connect to the external electrical power source at the same time to supply the power required by the second loading state. When the control device senses that the electric motor 40 needs to operate in a third loading state, it will make the first primary winding 420 and the second secondary winding 424 connect to the external electrical power source at the same time to supply the power required by the third loading state. And w % ben the control device senses that the electric motor 40 needs to operate in a fourth loading state, it will make only the first primary winding 420 connect to the external electrical power source at the same time to supply the power required by the fourth loading state.

Figure 9:
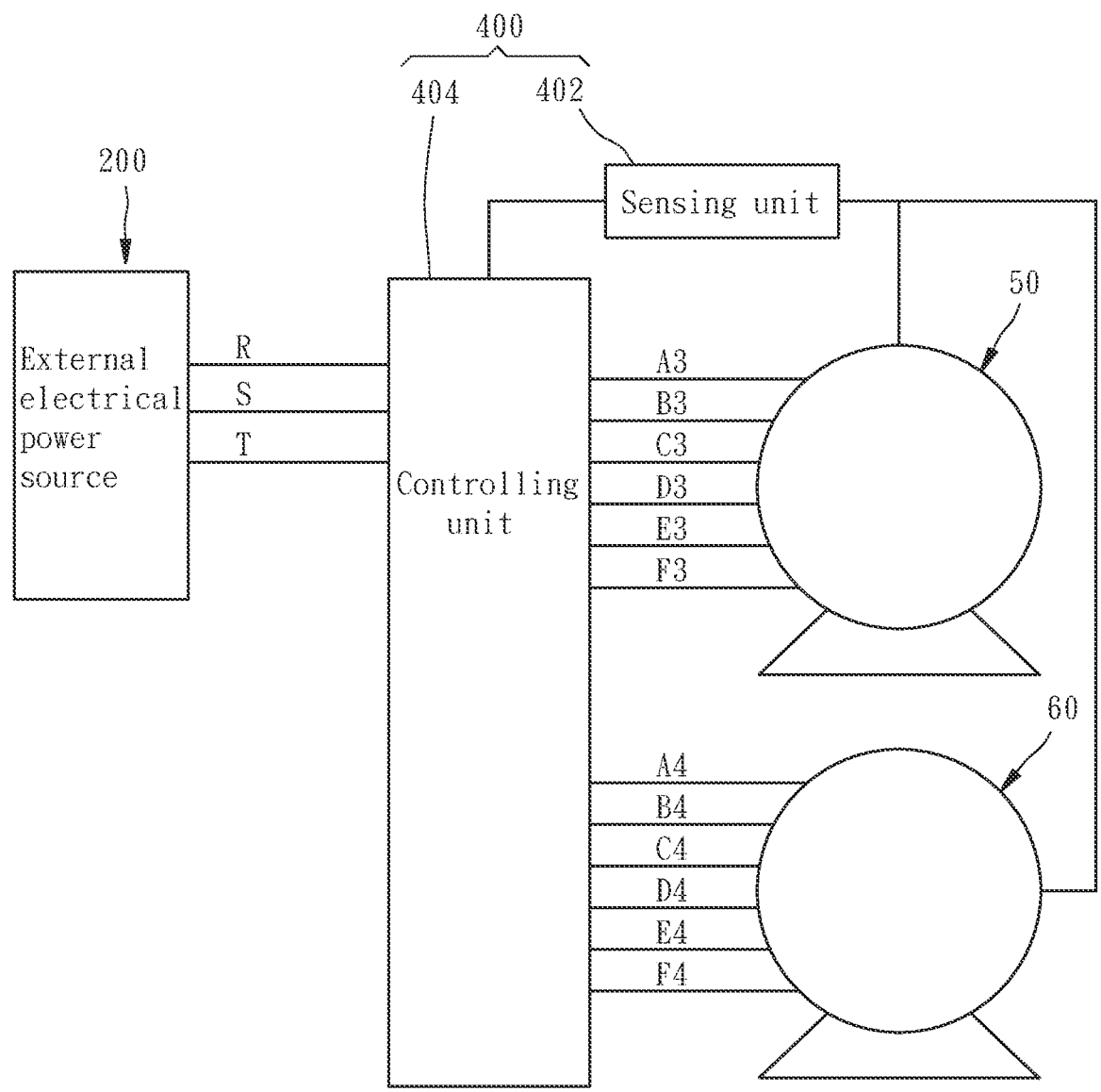
FIG. 9 is a block diagram illustrating the electric power connection of a fifth preferred embodiment of the present invention.

Next, as shown in FIG. 9, a fifth preferred embodiment of the present invention is disclosed. The fifth preferred embodiment provides a fifth electric motor and a sixth electric motor 60. The fifth electric motor 50 and the sixth electric motor 60 are also a three-phase induction motor as provided in the first preferred embodiment. The fifth electric motor 50 here comprises a fifth stator winding unit including the first winding group with four magnetic poles, a first primary rated power and a first secondary rated power being smaller than the first primary rated power. The sixth electric motor 60 here comprises a sixth stator winding unit including the first winding group with four magnetic poles, a second primary rated power and a second secondary rated power being smaller than the second primary rated power.

The external electrical power source 200 is connected to each of the electric motors 50, 60 via a fourth control device 400 comprising a fourth sensing unit 402 and a fourth controlling unit 404. In more detail, the fourth sensing unit 402 is respectively coupled with each of the electric motors 50,60 and the second controlling unit 404. The fourth control unit 404 is connected to a primary winding of the fifth electric motor 50 via lines A3, B3, and C3, and connected to a secondary winding of the fifth electric motor 50 via D3, E3, and F3. And the fourth control unit 404 is connected to a primary winding of the sixth electric motor 60 via lines A4, B4, and C4, and connected to a secondary winding of the sixth electric motor 60 via lines D4, E4, and F4.

Thereby, the fifth preferred embodiment will have at least five different power outputs. Please refer to the following table:

|  | the fifth electric motor 50 | | the sixth electric motor 60 | |
| --- | --- | --- | --- | --- |
|  | primary winding | secondary winding | primary winding | secondary winding |
| start up | ON | ON | ON | ON |
| First loading state | ON | | | |
| Second loading state | | ON | | |
| Third loading state | ON | ON | | |
| Fourth loading state | | | ON | |
| Fifth loading state | | | | ON |

It can be seen from the above table that when the control device 400 senses that a needed loading is in the starting up state, the first winding group of the electric motors 50, 60 are simultaneously connected to the external electrical power source 200. When the control device 400 senses a first needed loading state, only the primary winding of the electric motor 50 is connected to the external electrical power source 200. When the control device 400 senses a second needed loading state, only the secondary winding of the electric motors 50 is connected to the external electrical power source 200. When the control device 400 senses a third needed loading state needed, the first winding and the secondary winding of the electric motor 50 are simultaneously connected to the external electrical power source 200. When the control device 400 senses a fourth needed loading state, only the primary winding of the electric motor 60 is connected to the external electrical power source 200. And when the control device 400 senses a fifth needed loading state, only the secondary winding of the electric motors 60 is connected to the external electrical power source 200. It must be mentioned here that the fifth preferred embodiment of the present invention can be used in an air-conditioning compressor or similar devices, for example, the two ends of an output shaft of an air-conditioning compressor can be respectively coupled with a fifth electric motor 50 and a sixth electric motor 60.

Figure 10:
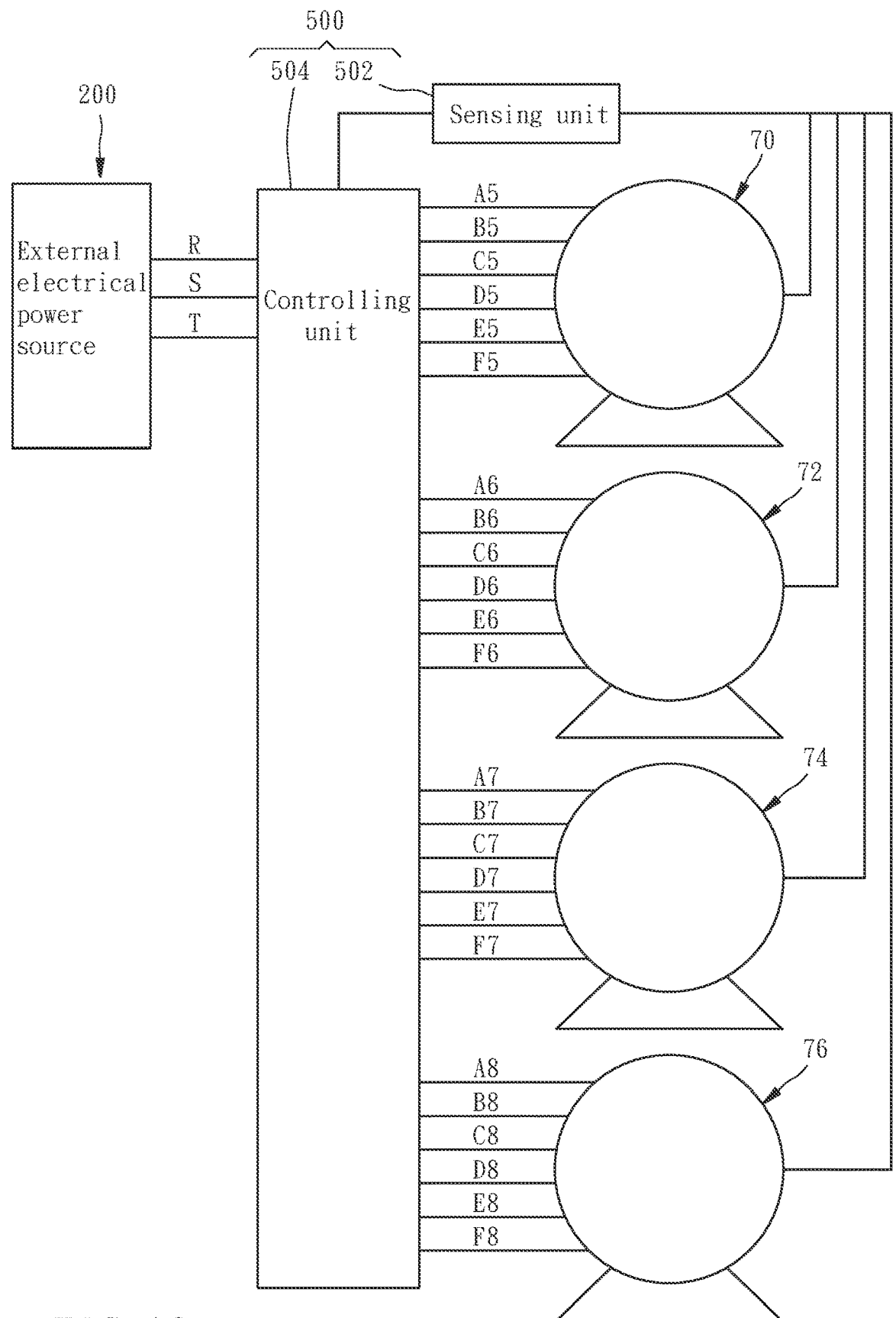
FIG. 10 is a block diagram illustrating the electric power connection of a sixth preferred embodiment of the present invention.

Lastly, as shown in FIG. 10, a sixth preferred embodiment of the present invention is disclosed. The sixth preferred embodiment provides four three-phase induction motors as provided in the first preferred embodiment, that is, a seventh electric motor 70, an eighth electric motor 72, a ninth electric motor 74 and a tenth electric motor 76. Each of the electric motors 70, 72, 74 and 76 includes a stator winding unit including the first winding group with four magnetic poles. The first winding group of the seventh electric motor 70 has a first primary rated power and a first secondary rated power being smaller than the first primary rated power. The first winding group of the eighth electric motor 72 has a second primary rated power and a second secondary rated power being smaller than the second primary rated power. The second primary rated power may be the same as or different from the first primary rated power, and the second secondary rated power may be the same or different from the first secondary rated power. The first winding group of the ninth electric motor 74 has a third primary rated power and a third secondary rated power being smaller than the third primary rated power. The third primary rated power can be the same as or different from the first primary rated power and the second primary rated power, and the third secondary rated power may be the same as or different from the first secondary rated power and the second secondary rated power. The first winding group of the tenth electric motor 76 has a fourth primary rated power and a fourth secondary rated power being smaller than the fourth primary rated power. The fourth primary rated power can be the same as or different from the first primary rated power, the second primary rated power and the third primary rated power, and the fourth secondary rated power may be the same as or different from the first secondary rated power, the second secondary rated power and the third secondary rated power.

In this embodiment, the external electrical power source 200 is connected to each of the electric motors 70,72,74 and 76 via a fifth control device 500 comprising a fifth sensing unit 502 and a fifth controlling unit 504. In more detail, the fifth sensing unit 502 is respectively coupled with each of the electric motors 70,72,74 and 76 and the fifth controlling unit 504. The fourth control unit 504 is connected to a primary winding of the seventh electric motor 70 via lines A5, B5, and C5, and connected to a secondary winding of the seventh electric motor 70 via D5, E5, and F5. The fifth control unit 504 is connected to a primary winding of the eighth electric motor 72 via lines A6. B6, and C6, and connected to a secondary winding of the eighth electric motor 72 via lines D6, E6, and F6. The fifth control unit 504 is connected to a primary winding of the ninth electric motor 74 via lines A7, B7, and C7, and connected to a secondary winding of the ninth electric motor 74 via lines D7, E7 and F7. And the fifth control unit 504 is connected to a primary winding of the tenth electric motor 76 via lines A8, B8, and C8, and connected to a secondary winding of the tenth electric motor 76 via lines D8, E8, and F8. Thereby, the sixth preferred embodiment will have at least seven different power outputs. Please refer to the following table:

| | The seventh electric motor 70 | | The eighth electric motor 72 | | The ninth electric motor 74 | | The tenth electric motor 76 | |
|---|---|---|---|---|---|---|---|---|
| | primary winding | secondary winding | primary winding | secondary winding | primary winding | secondary winding | primary winding | secondary winding |
| start up | ON | | ON | | ON | | ON | |
| First loading state | ON | | ON | | | | | |
| Second loading state | | ON | | ON | | | | |
| Third loading state | | | | | ON | | | |
| Fourth loading state | | | | | | | ON | |
| Fifth loading state | | | | | | ON | | |
| Sixth loading state | | | | | | | | ON |

It can be seen from the above table that w % ben the control device 500 senses that a needed loading is in the starting up state, the primary winding of each of the electric motors 70,72,74 and 76 are simultaneously connected to the external electrical power source 200. When the control device 500 senses a first needed loading state, only the primary winding of the electric motors 70 and 72 are connected to the external electrical power source 200. When the control device 500 senses a second needed loading state, the secondary winding of each of the electric motors 70,72, 74 and 76 are simultaneously connected to the external electrical power source 200. When the control device 500 senses a third needed loading state needed, only the primary winding of the ninth electric motor 74 is connected to the external electrical power source 200. When the control device 500 senses a fourth needed loading state needed, only the primary winding of the tenth electric motor 76 is connected to the external electrical power source 200. When the control device 500 senses a fifth needed loading state needed, only the secondary winding of the ninth electric motor 74 is connected to the external electrical power source 200. And when the control device 500 senses a sixth needed loading state needed, only the secondary winding of the tenth electric motor 76 is connected to the external electrical power source 200. It must be mentioned here that the sixth preferred embodiment of the present invention can be used in electric vehicles or similar devices.

What is claimed is:

1. A method for controlling the outputs of electric motors, comprising the steps of:

providing at least an electric motor comprising a stator, a rotor being rotatable relative to the stator, the stator including a plurality of stator slots, a plurality of stator teeth, and a stator winding unit being wound on the stator teeth and installed in the stator slots, the stator winding selected from a group consisting of a first winding group, a second winding group, a third winding group and a fourth winding group; the first winding group comprising a first primary winding with a first number of poles and a first rated power and a first secondary winding with the first number of poles and a second rated power being smaller than the first rated power; the second winding group comprising a second primary winding with a second number of poles and a third rated power, and a second secondary winding with a third number of poles and a fourth rated power being smaller than the third rated power; the third winding group comprising a third primary winding with a fourth number of poles and a fifth rated power, a fourth primary winding with a fifth number of poles and a sixth rated power being smaller than the fifth rated power, a third secondary winding with the fourth number of poles and a seventh rated power being smaller than the fifth rated power, and a fourth secondary winding with the fifth number of poles and a eighth rated power being smaller than the sixth rated power; the fourth winding group comprising a fifth primary winding with a sixth number of poles and a ninth rated power, a fifth secondary winding with the sixth number of poles and a tenth rated power being smaller than the ninth rated power, and a sixth second secondary winding with the sixth number of poles and a eleventh rated power being smaller than the tenth rated power;

providing a first control device respectively coupled with the electric motor and an external electrical power source for sensing a needed loading state of the electric motor and suppling a required connection relationship between the stator winding unit and the external electrical power source based on the needed loading state sensed by the first control device; the required connection relationship between the stator winding unit and the external electrical power source selected from one of the following connection relationships;

when the stator winding unit comprises the first winding group, and the first control device senses a first needed loading state, the first primary winding and the first secondary winding are simultaneously connected to the external electrical power source;

when the stator winding unit comprises the first winding group, and the first control device senses a second needed loading state being smaller than the first loading state, only the first primary winding is connected to the external electrical power source;

when the stator winding unit comprises the second winding group, and the first control device senses a third needed loading state, the second primary winding is connected to the external electrical power source;

when the stator winding unit comprises the second winding group, and the first control device senses a fourth needed loading state being smaller than the third loading state, the second secondary winding is connected to the external electrical power source;

when the stator winding unit comprises the third winding group, and the first control device senses a fifth needed loading state, the third primary winding and the third secondary winding are connected to the external electrical power source;

when the stator winding unit comprises the third winding group, and the first control device senses a sixth needed loading state being smaller than the fifth loading state, only the third primary winding is connected to the external electrical power source;

when the stator winding unit comprises the third winding group, and the first control device senses a seventh needed loading state, the fourth primary winding and the fourth secondary winding are connected to the external electrical power source;

when the stator winding unit comprises the third winding group, and the first control device senses an eighth needed loading state being smaller than the seventh loading state, only the fourth primary winding is connected to the external electrical power source;

when the stator winding unit comprises the fourth winding group, and the first control device senses a ninth needed loading state, the fifth primary winding, the fifth secondary winding and the sixth secondary winding are connected to the external electrical power source;

when the stator winding unit comprises the fourth winding group, and the first control device senses a tenth needed loading state being smaller than the ninth loading state, the fifth primary winding and the fifth secondary winding are connected to the external electrical power source;

when the stator winding unit comprises the fourth winding group, and the first control device senses an eleventh needed loading state being smaller than the tenth loading state, the fifth primary winding and the sixth secondary winding are connected to the external electrical power source; and when the stator winding unit comprises the fourth winding group, and the first control device senses a twelfth loading state being smaller than the eleventh loading state, only the fifth primary winding is connected to the external electrical power source.

2. The method for controlling the outputs of electric motors of claim 1, wherein the electric motor is a three-phase induction motor.

3. The method for controlling the outputs of electric motors of claim 1, wherein the first control device comprises a sensing unit coupled with the electric motor for sensing a needed loading state of the electric motor, and a controlling unit respectively coupled with the electric motor and an external electrical power source for suppling a required connection relationship between the stator winding unit and the external electrical power source based on the needed loading state sensed by the sensing unit.

4. A method for controlling the outputs of electric motors, comprising the steps of:

providing at least two electric motors of claim 1, and
providing a second control device respectively coupled with each of the electric motors and an external electrical power source for sensing a needed loading state of each of the electric motors and suppling a required connection relationship between the stator winding unit of each of the electric motors and the external electrical power source based on the needed loading state sensed by the second control device.

5. A method for controlling the outputs of electric motors, comprising the steps of:
providing a first electric motor comprising a first stator, a first rotor being rotatable relative to the first stator, the first stator including a plurality of first stator slots, a plurality of first stator teeth, and a first stator winding unit being wound on the first stator teeth and installed in the first stator slots, the first stator winding unit comprising a first winding group comprising a first primary winding with a first number of poles and a first rated power and a first secondary winding with the first number of poles and a second rated power being smaller than the first rated power;
providing a second electric motor comprising a second stator, a second rotor being rotatable relative to the second stator, the second stator including a plurality of second stator slots, a plurality of second stator teeth, and a second stator winding unit being wound on the second stator teeth and installed in the second stator slots, the second stator winding unit comprising a second winding group comprising a second primary winding with the first number of poles and a third rated power and a second secondary winding with the first number of poles and a fourth second rated power being smaller than the third rated power;
providing a control device respectively coupled with the first electric motor, the second electric motor and an external electrical power source for sensing a needed loading state of the first and second electric motors and suppling a required connection relationship between the first stator winding unit, the second stator winding unit and the external electrical power source based on the needed loading state sensed by the third control device;
the required connection relationship between the first stator winding unit, the second stator winding unit and the external electrical power source selected from one of the following connection relationships:
when the control device senses a first needed loading state, the first primary winding, the first secondary winding, the second primary winding and the second secondary winding are simultaneously connected to the external electrical power source;
when the control device senses a second needed loading state, the first primary winding and the second primary winding are simultaneously connected to the external electrical power source;
when the control device senses a third needed loading state, the first primary winding and the first secondary winding are simultaneously connected to the external electrical power source;
when the third control device senses a fourth needed loading state, only the first primary winding or the second primary winding is connected to the external electrical power source; and
when the control device senses a fifth needed loading state,
only the first secondary winding or the second secondary winding is connected to the external electrical power source.

6. A method for controlling the outputs of electric motors, comprising the steps of:
providing a first electric motor comprising a first stator, a first rotor being rotatable relative to the first stator, the first stator including a plurality of first stator slots, a plurality of first stator teeth, and a first stator winding unit being wound on the first stator teeth and installed in the first stator slots, the first stator winding unit comprising a first winding group comprising a first primary winding with a first number of poles and a first rated power and a first secondary winding with the first number of poles and a second rated power being smaller than the first rated power;
providing a second electric motor comprising a second stator, a second rotor being rotatable relative to the second stator, the second stator including a plurality of second stator slots, a plurality of second stator teeth, and a second stator winding unit being wound on the second stator teeth and installed in the second stator slots, the second stator winding unit comprising a second winding group comprising a second primary winding with a second number of poles and a third rated power and a second secondary winding with a third number of poles and a fourth rated power being smaller than the third rated power;
providing a control device respectively coupled with the first electric motor, the second electric motor and an external electrical power source for sensing a needed loading state of the first and second electric motors and suppling a required connection relationship between the first stator winding unit, the second stator winding unit and the external electrical power source based on the needed loading states sensed by the control device;
the required connection relationship between the first stator winding unit, the second stator winding unit and the external electrical power source selected from one of the following connection relationships:
when the control device senses a first needed loading state, then first primary winding, the first secondary winding, and the second primary winding are simultaneously connected to the external electrical power source;
when the control device senses a second needed loading state, the first primary winding and the first secondary winding are simultaneously connected to the external electrical power source;
when the control device senses a third needed loading state, only the first secondary winding is connected to the external electrical power source;
when the control device senses a fourth needed loading state, only the second primary winding is connected to the external electrical power source; and
when the control device senses a fifth needed loading state, only the second secondary winding is connected to the external electrical power source.

7. The method for controlling the outputs of electric motors of claim 6, wherein the third number of poles is the same as the fourth number of poles.

8. A method for controlling the outputs of electric motors, comprising the steps of:
providing first electric motor comprising a first stator, a first rotor being rotatable relative to the first stator, the first stator including a plurality of first stator slots, a plurality of first stator teeth, and a first stator winding unit being wound on the first stator teeth and installed in the first stator slots, the first stator winding unit comprising a first winding group comprising a first primary winding with a first number of poles and first rated power and a first secondary winding with the first number of poles and a second rated power being smaller than the first rated power;

providing a second electric motor comprising second stator, a second rotor being rotatable relative to the second stator, the second stator including a plurality of second stator slots, a plurality of second stator teeth, and a second stator winding unit being wound on the second stator teeth and installed in the second stator slots, the second stator winding unit comprising a second winding group comprising a second primary winding with the first number of poles and a third rated power, a second secondary winding with the first number of poles and a third fourth rated power being smaller than the third rated power, a third primary winding with third number of poles and a fifth rated power, a third secondary winding with the third number of poles and a sixth rated power being smaller than the fifth rated power;

providing a control device respectively coupled with the first electric motor, the second electric motor and an external electrical power source for sensing a needed loading states of the first and second electric motors, and suppling a required connection relationship between the first stator winding unit, the second stator winding unit and the external electrical power source based on the needed loading states sensed by the fifth control device;

the required connection relationship between the first stator winding unit, the second stator winding unit and the external electrical power source selected from one of the following connection relationships:

when the control device senses a first needed loading state, the first primary winding, the first secondary winding, the second primary winding and the second secondary winding are simultaneously connected to the external electrical power source;

when the control device senses a second loading state, the first primary winding and the first secondary winding are simultaneously connected to the external electrical power source;

when the control device senses a third needed loading state, the second primary winding and the second secondary winding are simultaneously connected to the external electrical power source;

when the control device senses a fourth needed loading state, the first primary winding and the second primary winding are simultaneously connected to the external electrical power source;

when the control device senses a fifth needed loading state, the third primary winding and the third secondary winding are simultaneously connected to the external electrical power source;

when the control device senses a sixth needed loading state, only the first primary winding is connected to the external electrical power source;

when the control device senses a seventh needed loading state, only the second primary winding is connected to the external electrical power source;

when the control device senses an eighth needed loading state, only the third primary winding is connected to the external electrical power source;

when the control device senses a ninth needed loading state, only the first secondary winding is connected to the external electrical power source;

when the control device senses a tenth needed loading state, only the second secondary winding is connected to the external electrical power source; and when the control device senses an eleventh needed loading state, only the third secondary winding is connected to the external electrical power source.

9. A method for controlling the outputs of electric motors, comprising the steps of:

providing a first electric motor comprising a first stator, a first rotor being rotatable relative to the first stator, the first stator including a plurality of first stator slots, a plurality of first stator teeth, and a first stator winding unit being wound on the first stator teeth and installed in the first stator slots, the first stator winding unit comprising a first winding group comprising a first primary winding with a first number of poles and a first rated power and a first secondary winding with the first number of poles and a second rated power being smaller than the first rated power;

providing a second electric motor comprising a second stator, a second rotor being rotatable relative to the second stator, the second stator including a plurality of second stator slots, a plurality of second stator teeth, and second stator winding unit being wound on the second stator teeth and installed in the second stator slots, the second stator winding unit comprising a second winding group comprising a second primary winding with the second number of poles and a third rated power, a second secondary winding with the first number of poles and a fourth rated power being smaller than the third rated power, a third secondary winding with the first number of poles and a fifth rated power being smaller than the fourth rated power;

providing a control device respectively coupled with the first electric motor, the second electric motor and an external electrical power source for sensing a needed loading state of the first and second electric motors, and suppling a required connection relationship between the first stator winding unit, the second stator winding unit and the external electrical power source based on the needed loading state by the control device;

the required connection relationship between the first stator winding unit, the second stator winding unit and the external electrical power source selected from one of the following connection relationships:

when the control device control device senses a first needed loading state, the first primary winding, the first secondary winding, the second primary winding primary winding, the second secondary winding and the third secondary winding are simultaneously connected to the external electrical power source;

when the control device control device senses a second needed loading state, the first primary winding and second primary winding primary winding are simultaneously connected to the external electrical power source;

when the control device control device senses a third needed loading state, the first primary winding and the first secondary winding are simultaneously connected to the external electrical power source;

when the control device control device senses a fourth needed loading state, the second primary winding, the second secondary winding and the ninth secondary winding are simultaneously connected to the external electrical power source;

when the control device control device senses a fifth needed loading state, only the first primary winding is connected to the external electrical power source;

when the control device control device senses a sixth needed loading state, only the first secondary winding is connected to the external electrical power source;

when the control device control device senses a seventh needed loading state, the second primary winding and second secondary winding are simultaneously connected to the external electrical power source;

when the control device control device senses an eighth needed loading state, the second primary winding and the third secondary winding are simultaneously connected to the external electrical power source;

when the control device control device senses a ninth needed loading state, only the second primary winding is connected to the external electrical power source;

when the control device control device senses a tenth needed loading state, only the second secondary winding is connected to the external electrical power source; and when the control device control device senses an eleventh needed loading state, only the third secondary winding is connected to the external electrical power source.

* * * * *